K. v. HÖHNE.
AUTOMATIC SPEED CHANGING MECHANISM.
APPLICATION FILED FEB. 26, 1908.

904,330.

Patented Nov. 17, 1908.

WITNESSES:
W. M. Avery
J. P. Davis

INVENTOR
Kurt von Höhne
BY
Munn & Co
ATTORNEYS

UNITED STATES PATENT OFFICE.

KURT V. HÖHNE, OF CHARLOTTENBURG, GERMANY.

AUTOMATIC SPEED-CHANGING MECHANISM.

No. 904,330.   Specification of Letters Patent.   Patented Nov. 17, 1908.

Application filed February 26, 1908. Serial No. 417,911.

*To all whom it may concern:*

Be it known that I, KURT VON HÖHNE, a subject of the German Emperor, and residing at 20/21, Uhlandstrasse, Charlottenburg, Germany, have invented a certain new and useful Automatic Speed-Changing Mechanism, of which the following is a specification.

This invention has for its object to provide an improved method and apparatus by means of which the speed ratio of pulleys, shafts and the like connected by gearing, can be changed automatically in accordance with the greater or smaller speed of the driven pulley, shaft or the like, in such a manner as to insure a uniform speed of rotation of the motor.

According to this invention a belt pulley composed of sectors which are adjustable by centrifugal action, is mounted on the driven shaft.

The improved apparatus is designed chiefly for motor road vehicles, but is also capable of being used for other purposes, for instance, in machine tools.

One construction of the improved apparatus is shown by way of example in the accompanying drawings in which:—

Figure 1:
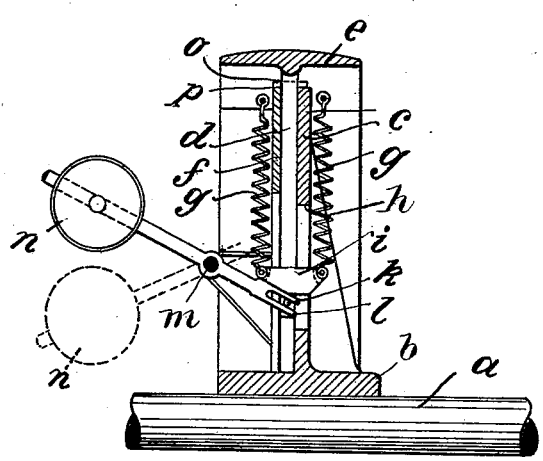
Figure 2:
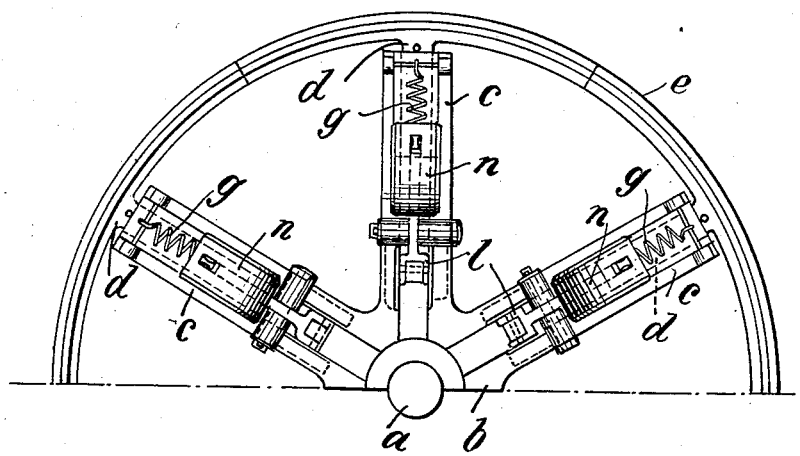

Figure 1 is a cross section taken along the axis of the shaft, and Fig. 2 is a front elevation of the apparatus.

Similar characters of reference indicate corresponding parts in all the views.

$a$ indicates the driven shaft on which the hub $b$ is mounted. This hub comprises a number of fixed spokes $c$. In the present example six such spokes are presumed. The spokes $c$ have a U-shaped cross-section, and in each spoke there is slidably mounted a sliding spoke $d$ which is formed at its outer end as a sector $e$ of the periphery of the belt pulley. The slide way in each fixed spoke $c$ is closed in front by a plate $f$. Springs $g$ are provided having a tendency to pull the sectors $e$ towards the periphery of the pulley. A stop $h$ serves to limit the stroke of each sector. The sliding spoke $d$ is constricted to some extent at $i$ where it carries a pin $k$ which is engaged by a fork $l$. This fork is pivoted at $m$ and carries a weight $n$ at its end. Another stop $o$ on the sliding spoke $d$ serves to limit the stroke of the latter towards the center, by bearing against the edge $p$ of the plate $f$.

The operation of the apparatus is as follows:—If the speed of rotation of the shaft $a$ increases, the weights $n$ will move outwards and thereby exert an inwardly directed pull on the sectors $e$. The full lines indicate the outermost position of the weights $n$ in which the pulley has its smallest diameter, that is to say, when the greatest speed ratio is operative.

It is to be understood that the weights $n$ must be much heavier than the sectors $e$ together with the parts moving with the latter. The inward movement of the sectors diminishes the diameter of the pulley and thereby increases the speed ratio. Thus when the vehicle is traveling along a flat road, a high speed ratio will come automatically in operation, corresponding to the conditions for flat roads, viz., small tractive force and high speed. When on the contrary, the vehicle is traveling slowly uphill, then the weights $n$ will be caused by the springs $g$ to move towards the center of the shaft $a$, and the diameter of the pulley will increase, because the sectors $e$ are thereby moved away from the center of the shaft. The result of this is, that the speed ratio will become gradually diminished in accordance with the required high tractive force at a low speed. The two extreme positions of the weights $n$ are indicated by dotted lines and full lines respectively.

In the construction shown in the drawings, gaps are formed between the sectors, but they do not affect the belt injuriously to any substantial extent. A continuous circumference may however be provided by making the rim of the pulley of a steel band or strip having overlapping ends. The strip is then adjusted by means of movable pieces and centrifugal weights in a similar manner to the sectors.

Having now described my invention, what I claim as new and desire to secure by Letters Patent is:—

1. In automatic speed changing mechanism, the combination with the driven shaft, of a pulley mounted with its hub on said shaft, having fixed spokes, movable spokes mounted and guided in a parallel manner in said fixed spokes, sectors connected to said movable spokes, centrifugal weights, and forked parts connecting said centrifugal weights with said movable spokes, as set forth.

2. In automatic speed changing mechanism, the combination with the driven shaft, of a pulley mounted with its hub on said shaft, fixed spokes on the hub, movable spokes mounted and guided in a parallel manner in said fixed spokes, springs connected at one end to the fixed spokes and at the other end to the movable spokes, pulley sectors on the outer ends of the movable spokes, centrifugal weights and forked rods carrying said weights and connected to the movable spokes as set forth.

In testimony whereof I have signed my name to this specification in the presence of two subscribing witnesses.

KURT V. HÖHNE.

Witnesses:
 WOLDEMAR HAUPT,
 HENRY HASPER.